D. F. & C. B. COWELL.
RAIN AND SNOW SHIELD FOR VEHICLES.
APPLICATION FILED JAN. 8, 1915.
1,155,705. Patented Oct. 5, 1915.
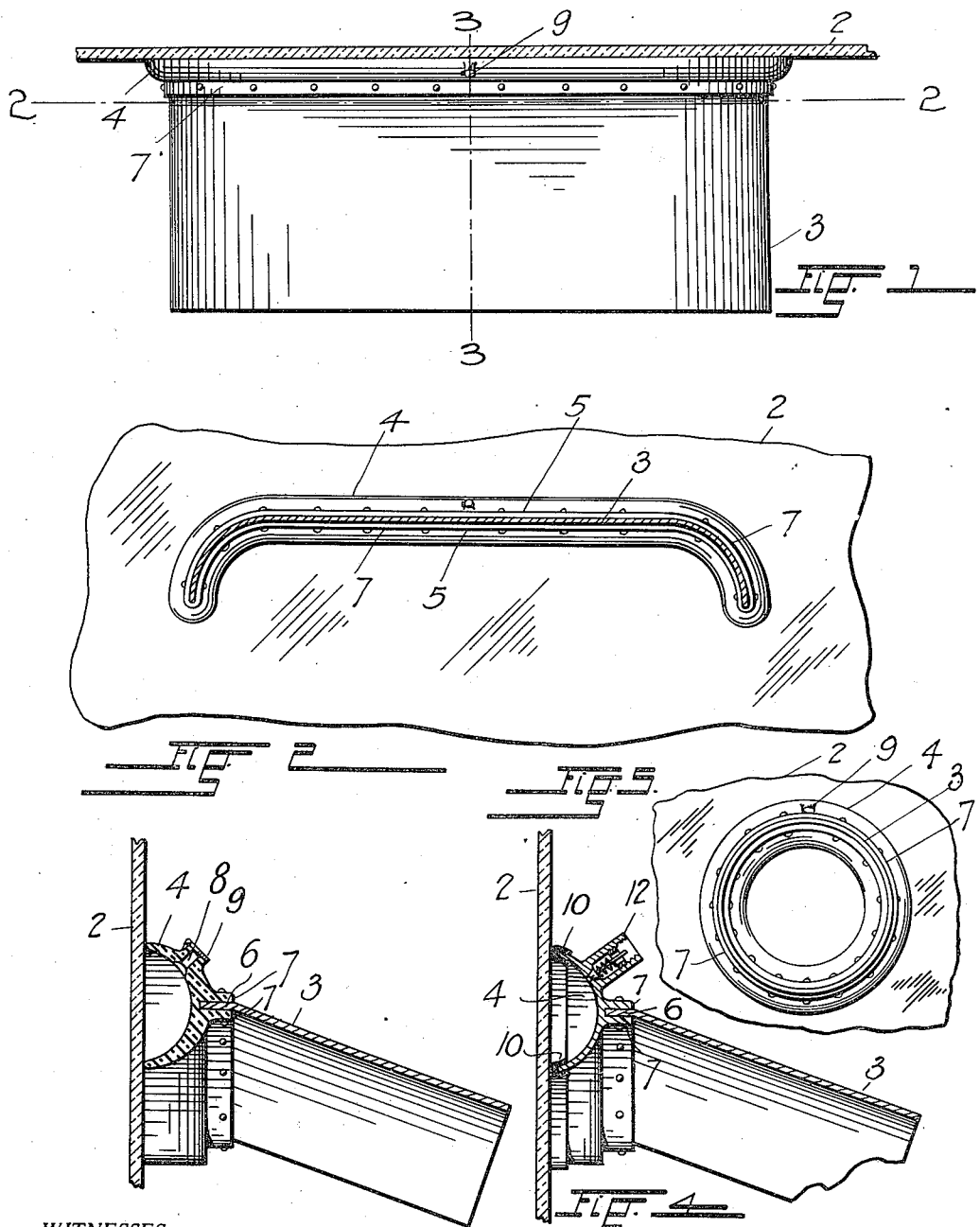
WITNESSES:
F. H. Cuno
L. Rhoades
INVENTORS.
D. F. Cowell and
C. B. Cowell.
BY
ATTORNEY.

UNITED STATES PATENT OFFICE.

DON F. COWELL AND CHARLES B. COWELL, OF DENVER, COLORADO.

RAIN AND SNOW SHIELD FOR VEHICLES.

1,155,705.

Specification of Letters Patent.

Patented Oct. 5, 1915.

Application filed January 8, 1915. Serial No. 1,119.

*To all whom it may concern:*

Be it known that we, DON F. COWELL and CHARLES B. COWELL, citizens of the United States, residing at Denver, in the county of Denver and State of Colorado, have invented certain new and useful Improvements in Rain and Snow Shields for Vehicles, of which the following is a specification.

This invention relates to improvements in rain and snow shields for use on automobiles and other vehicles, and its principal object resides in the provision of a shield which may be secured in an operative position against a glass wind shield of an automobile, the glass window at the front of a closed vehicle or against the smooth sustaining surface above the said window, without the use of hooks, screws or other fastening means which for their attachment necessitate defacement of the part of the vehicle to which the shield is applied.

With the above object in view, our invention consists in providing in connection with a shield of suitable size and form, a vacuum element capable of securely retaining the shield in its operative position against a plate of glass or other smooth surface by atmospheric pressure.

An embodiment of our invention is illustrated in the accompanying drawings in the various views of which like parts are similarly designated, and in which, Figure 1 is a top view of the improved rain and snow shield in its operative position with relation to a plate of glass or the like, Fig. 2, a section taken along the line 2—2, Fig. 1, Fig. 3, an enlarged transverse section along the line 3—3, Fig. 1. Fig. 4, a similar section showing a modified construction of the vacuum member of the device, and Fig. 5, a face view showing a modified construction of the shield.

Referring more specifically to the drawings, the reference numeral 2 designates a plate of glass or other smooth surfaced part to which the shield is applied; 3 designates the shield member of our invention, and 4 the vacuum member of the same, with which the first-mentioned member is rigidly connected.

In the construction shown in Figs. 1, 2 and 3 of the drawings, the vacuum member consists of an elongated cup of rubber or other resilient material, concaved at the side at which it, in practice, engages the surface to which the shield is applied, and closed at its ends.

The member has upon its exterior surface, two longitudinally extending ribs 5 which are spaced to provide a recess for the reception of an edge of the shield member.

The shield is composed of a light plate made of metal, preferably aluminum, vulcanized rubber, wood or other suitable material. It has at one of its longitudinal edges, a flange 6 which is bent at an obtuse angle to its body portion and which is placed in the space between the ribs of the vacuum cup and rigidly secured to the same by means of screws, nails, rivets or the like.

When the parts of the device are thus assembled, the body portion of the shield member extends at a downward slant with relation to the surface engaged by the concave side of the vacuum member as shown in Figs. 3 and 4 of the drawings.

The end portions of both members of the device may be curved downwardly as shown at 7 in Fig. 2, to more thoroughly protect the surface to which it is applied, from rain or snow, or the members may be formed so as to provide a cylindrical shield such as is shown in Fig. 5, to adapt it for use on locomotives or other vehicles which are more than ordinarily subjected to inclemencies of the weather.

The vacuum member is in its preferred form, provided with an outlet 8 normally closed by an outwardly opening check valve 9, for the escape of air from its hollow when its concave side is pressed against the surface to which the shield is applied.

From the above description, taken in connection with the drawings, the simplicity of the device and its advantages for the purpose for which it is designed, will be clearly apparent to those skilled in the art to which my invention appertains.

To secure the shield in its proper position with relation to the outer surface of a window or wind shield of a vehicle, the flexible wall of the cup is after the latter has been placed with its hollow side against the surface, pressed inwardly to displace the air confined within the concavity. The displaced air is thus compelled to escape past the check valve and when the cup is subsequently released, the partial vacuum produced within its hollow will cause it to rigidly adhere to the surface by atmospheric pressure.

It will be understood that the valve which in the drawings is shown in its simplest form, may be made of whatever construction is found to be most suitable for the purpose.

In the modified construction shown in Fig. 4, the vacuum member is made of metal or other non-resilient material, its longitudinal edges at its hollow side are covered with strips 10 of rubber or other flexible material to effect an air-tight contact with the surface against which the cup is placed, and it is provided with a valve controlled nipple 12 for its connection with the rubber tube of a suction pump.

To apply a shield of the last-described construction to a surface, the air is by means of a pump attached to the nipple, exhausted from the hollow of its vacuum member after the rubber covered edges of the same have been placed against the glass.

With the shield in a horizontal position upon the upper portion of the wind shield or window of a vehicle, or above the same, snow and rain are prevented from obscuring the glass.

We desire it understood that while we have shown and described our improved shield in the most effective and simplest forms at present known to us, other variations in the construction, design and arrangement of its parts, may be resorted to within the spirit of our invention as defined in the following claim.

We claim—

A device of the type described, including a suction-exerting member in the form of an elongated cup of elastic material, with downwardly curved lateral portions and arcuate in cross-section, said cup-shaped suction-exerting member having longitudinal spaced ribs upon its forward rounded surface, and a shield or deflector slanting forwardly and downwardly and having an obtuse-angled inner terminal arranged for reception within the space between said longitudinal spaced ribs of the suction-exerting member.

In testimony whereof we have affixed our signatures in presence of two witnesses.

DON F. COWELL.
CHARLES B. COWELL.

Witnesses:
WILEY WILLIAMS,
LESLIE S. COPELAND.

Copies of this patent may be obtained for five cents each, by addressing the "Commissioner of Patents Washington, D. C."